Patented Oct. 2, 1928.

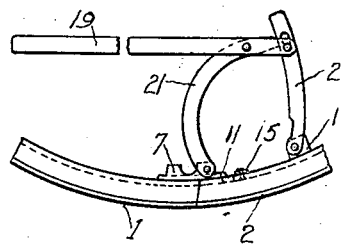
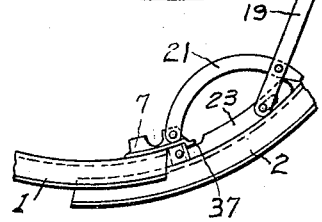
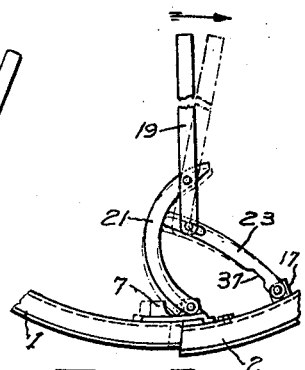
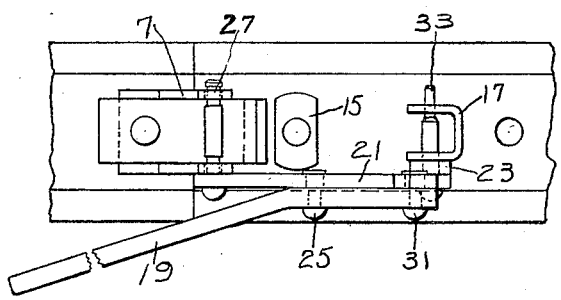
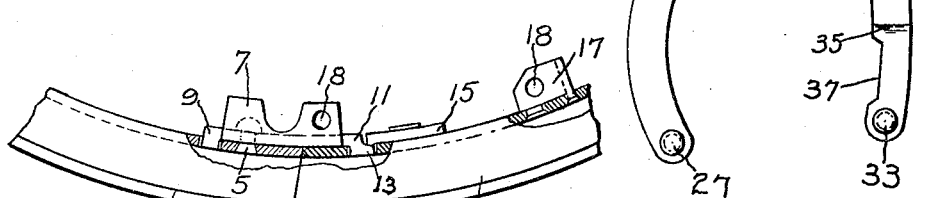
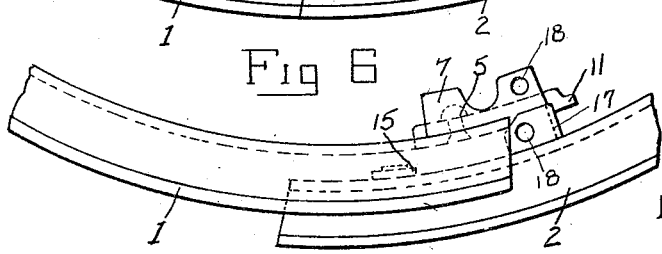

1,686,021

UNITED STATES PATENT OFFICE.

FRANK LE ROI MAIN, OF BIRMINGHAM, MICHIGAN, ASSIGNOR TO GENERAL MOTORS CORPORATION, OF DETROIT, MICHIGAN, A CORPORATION OF DELAWARE.

SPLIT-RIM TOOL.

Application filed October 24, 1925. Serial No. 64,605.

This invention relates to a tire rim and an operating tool therefor.

In transversely split rims as used to carry motor vehicle tires the joint between the two parts of the rim is usually broken and the rim contracted in the act of changing tires. The rim is then expanded, the parts restored to normal position and locked together, much difficulty is found in performing these operations, especially in the case of rims for large tires, and it is an object of this invention to provide a split rim and a tool for operating the same whereby the joints may be easily broken, and the rim contracted.

It is a further object of the invention to provide the rim parts with lugs and an operating tool cooperating with the rim parts whereby the rim joint may be broken by the tool and the rim contracted and the lugs brought into an engagement to hold the rim in contracted position. Under these circumstances the tool may, if desired, be removed while the tire is being changed.

For full understanding of the invention reference is made to the following specification and to the accompanying drawing, wherein Figure 1, Figure 2 and Figure 3 represent side views of the adjacent portions of the rim with the operating tool attached thereto, the three figures representing three different positions in the operation of the rim tool. Figure 4 is a plan view of the rim with the tool attached. Figure 5 is a side elevation of the operating tool by itself. Figure 6 is a side view of the rim parts as shown in Figure 1 on an enlarged scale, with the tool detached. Figure 7 is an enlarged side elevation corresponding with Figure 2.

Referring to the drawing, numerals 1 and 2 represent the adjacent ends of a rim. The part 1 has riveted thereto, as at 5, a generally U shaped driving lug 7. The base of the lug has an extension 9 at one end entering an opening therefor in the rim and also a depending extension 11 at its opposite end projected beyond the part 1 and adapted to enter a similarly shaped opening 13 in the rim part 2. To lock the parts of the rim together a latch member 15 is pivoted to rim end 2 and arranged to swing across and hold the depending extension 11 in the opening 13. On part 2 of the rim is a lug 17. This lug is as shown riveted to the rim. The lugs 7 and 17 are provided with apertures 18 to receive pivot bolts carried by the rim tool.

The rim tool is composed of three members. An operating handle 19, a link 21 and a second link 23. The handle 19 serves as a lever and is offset near its work end so that when in position as shown in Figure 4 the handle is faced away from the rim. At a point near its work end it is pivoted by a pin 25 to link 21. The latter is a curved bar extending a short distance from its pivot 25 where it has a flat end to engage at times the second link 23. The opposite end of link 21 carries a pivot bolt 27 intended for entry into aperture 18 of lug 7. The second link 23 is also curved. Its upper end has a slot 29 to receive a pivot bolt 31 carried at the end of handle 19. The other end of link 23 is provided with pivot bolt 33 for entry into the aperture 18 of lug 17. The pivoted end of this second link is offset as shown at 35 and is provided in the offset portion with a notch 37.

When a rim joint is to be broken the bolts 27 and 33 are entered into the aperture 18 of lugs 7 and 17 as explained above. The parts then assume the position as shown by Figure 1 and by Figure 4. The handle is then swung in a clockwise direction, as seen in Figure 1. The handle swings about its pivot with the link 23 and lifts by means of the link 21 the part 1 up from engagement with part 2 in a radial direction. As the clockwise movement of the handle continues rim part 1 moves circumferentially along rim part 2, part 2 guiding part 1 from any lateral movement. As extension 11 meets lug 17 it is raised slightly and the continuation of the circumferential movement brings the extension to a point where it drops over lug 17. In this position the rim is held securely in its contracted position by the engagement of parts 11 and 17 and also prevented from lateral movement by the engagement of the rim walls. The tool may then be removed during the tire changing operation.

When the tire changing operation is completed the tool is replaced. The handle is swung in a counter clock wise direction. The notch portion of link 23 lifts extension 11 from lug 17 and the parts are moved to the position shown in Figure 3 where the end of link 23 engages the inner surface of link 21. By a clockwise movement of the handle the link 21 fulcrums about the end of link 23 and the rim parts are spread slightly beyond normal position as shown by dotted lines in Figure 3. This ensures a proper engagement of the tire on the rim. By releasing the pressure on the handle the rim parts assume their normal position and extension 11 enters the rim aperture and may be locked.

Among the unique characteristics of the device are the provision for only sufficient radial movement to allow the rim parts to separate. Thereafter the relative movement is circumferential except for the slight camming action as the extension 11 is engaging the lug 17. The lock comprising the engagement of parts 11 and 17 is supplemented by the enagement of the walls of the rim parts so that there is no danger of the parts becoming disengaged. The final movement of handle which separates the rim parts somewhat beyond their normal position ensures the correct engagement of the tire with the rim.

I claim:

1. A split rim tool comprising a handle, a link intermediately pivoted adjacent an end of said handle, a second link intermediately pivoted to said handle at a point somewhat removed from said pivot, means on one arm of each link by which it may be connected to a rim adjacent the split, the other ends of the links lying in the same plane and slidably engaging each other upon the operation of the handle.

2. A rim tool comprising a handle, two links intermediately pivoted adjacent one end of the handle, one arm of each link having means for attachment to a rim, the other arms slidably engaging each other in the operation of the tool.

3. A rim tool comprising a handle, two links each intermediately pivoted at spaced points adjacent one end of the handle, the long arm of each link having means for attachment to a rim, the short arms engaging each other and having a limited sliding movement during which movement the handle acts as a lever of the second class to radially separate the ends of the rim.

In testimony whereof I affix my signature.

FRANK LE ROI MAIN.